(12) United States Patent
Yamaguchi

(10) Patent No.: US 8,074,240 B2
(45) Date of Patent: Dec. 6, 2011

(54) DISK DRIVE DEVICE WITH IMPROVED CENTERING HOLDING FUNCTION

(75) Inventor: Tsuyoshi Yamaguchi, Ueda (JP)

(73) Assignee: Sanyo Seimitsu Co., Ltd., Ueda-Shi (JP)

( * ) Notice: Subject to any disclaimer, the term of this patent is extended or adjusted under 35 U.S.C. 154(b) by 917 days.

(21) Appl. No.: 12/071,220

(22) Filed: Feb. 19, 2008

(65) Prior Publication Data

US 2008/0201729 A1    Aug. 21, 2008

(30) Foreign Application Priority Data

Feb. 20, 2007   (JP) ................................. 2007-039658

(51) Int. Cl.
*G11B 17/022*    (2006.01)

(52) U.S. Cl. .......................... 720/707; 720/604; 720/706

(58) Field of Classification Search ........... 720/604.651, 720/695, 703–704, 706–707, 709–710, 712, 720/715
See application file for complete search history.

(56) References Cited

U.S. PATENT DOCUMENTS

| | | | | |
|---|---|---|---|---|
| 5,501,760 A * | 3/1996 | Mukawa | ..................... | 156/305 |
| 6,208,613 B1 * | 3/2001 | Iizuka | .................... | 720/707 |
| 6,832,384 B2 * | 12/2004 | Yamaguchi | ................... | 720/724 |
| 2004/0205803 A1 * | 10/2004 | Horng et al. | ................... | 720/707 |
| 2006/0064712 A1 * | 3/2006 | Kim | ................... | 720/710 |
| 2008/0059984 A1 * | 3/2008 | Kanzawa et al. | ............. | 720/707 |

* cited by examiner

*Primary Examiner* — Daniell L Negron
*Assistant Examiner* — Carlos E Garcia
(74) *Attorney, Agent, or Firm* — Kratz, Quintos & Hanson, LLP

(57) ABSTRACT

A disc drive device able to increase the number of plastic flexible cantilever beams and improve a centering holding function of a disc to enable handling of high speed revolution, that is, a disc drive device having a plastic turntable mounted on a shaft of a spindle motor, wherein this turntable has a disc hole engagement projection provided with a ring-shaped projection and a plurality of centering portions which extend from this ring-shaped projection outwardly in a diametrical direction and have guide surfaces from which an edge of a disc hole easily slides off, a disc carrying portion, through holes formed defined between adjoining centering portions, and flexible cantilever beams extending in the through holes.

3 Claims, 4 Drawing Sheets

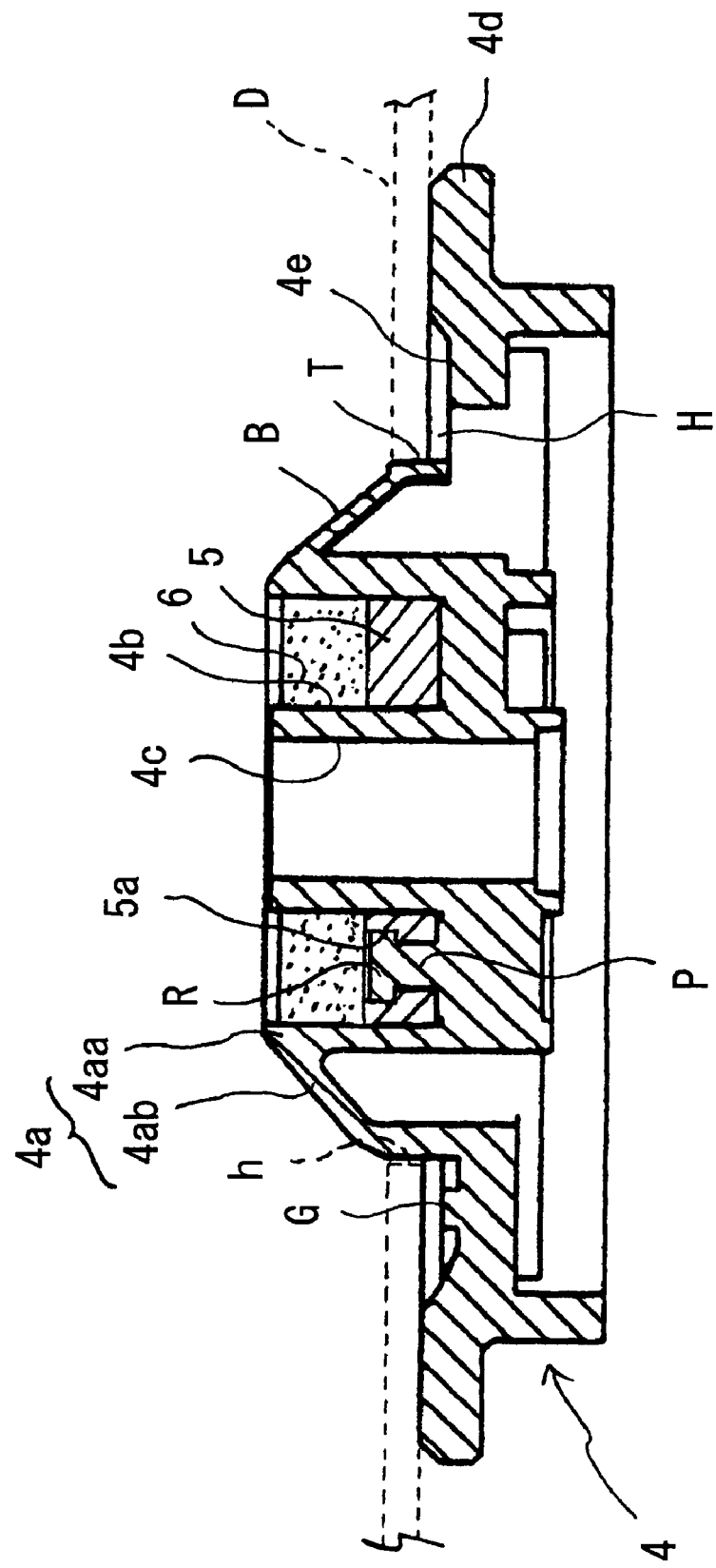

DISK DRIVE DEVICE WITH IMPROVED CENTERING HOLDING FUNCTION

BACKGROUND OF THE INVENTION

1. Field of the Invention

The present invention relates to a disc drive device for driving rotation of a CD-ROM, magneto-optical disc, and other disc media.

2. Description of the Art

For example, a disc drive device disclosed in FIG. 1 of Japanese Patent Publication No. 9-231674A has a plastic turntable mounted on a shaft of a spindle motor. This turntable is provided with a disc hole engagement projection with an outer circumference formed into a conical surface shape and with which a center hole of the disc is engaged, three through holes passing through the outer circumference of the disc hole engagement projection in the vertical direction at intervals of 120°, and a centering mechanism comprising flexible cantilever beams in the through holes extending outward in a diametrical direction from the disc hole engagement projection.

The center hole of a disc drops over the disc hole engagement projection, whereby the flexible cantilever beams are bent downward while the center of the disc approaches the center of the shaft. Due to this, the front end sides of the flexible cantilever beams resiliently contact the edge of the center hole and the disc is centered. For this reason, even if there is some variation in the diameter of the center hole of the disc, that variation is absorbed by the degrees of the bending amounts of the flexible cantilever beams.

The front end sides of the flexible cantilever beams resiliently contact and prop up the edge of the center hole, so, in addition to the centering function of the disc, also act to hold the centered state when a biased load is applied to the disc due to vibration etc. of the disc drive device at the time of turning of the turntable after that (centering holding function).

In actual circumstances of high speed driving of the turntable of for example 10,500 rpm or more, however, since there are only three flexible cantilever beams explained above at intervals of 120°, the centering holding function is insufficient. This becomes a factor of degradation of read/write precision and characteristics of a pick-up.

In order to eliminate this insufficiency of the centering holding function, an increase of the number of flexible cantilever beams may be considered, but this type of turntable has an outside diameter of at most about 30 mm. The flexible cantilever beams are also made of plastic, so the flexible centering cantilever beams cannot be narrowed in beam width due to strength considerations. Further, an increased number of through holes would result in the disc hole engagement projection itself becoming relatively weak in strength. Therefore, the number of flexible cantilever beams is limited to at most six and the centering holding function remains inferior.

On the other hand, increasing the beam width of the flexible cantilever beams without increasing the number of the flexible cantilever beams that much may be considered. However, elastic deformation of the flexible cantilever beams is important, yet greater beam length cannot be secured, therefore the cantilever beams increase in bending rigidity and end up being reduced in resiliency. Further, if increasing the beam width, a creep phenomenon peculiar to a plastic easily occurs and a longer service life is difficult to secure.

The positions (angles) where the front end portions of the flexible cantilever beams resiliently contact the hole edge or hole walls of the disc hole are limited when viewed microscopically. Therefore, as broader the beam width are made, the more the resilient contacting positions (angles) will differ among the cantilever beams, so an inferior centering function will be caused.

SUMMARY OF THE INVENTION

Therefore, in consideration with the above problems, an object of the present invention is to provide a disc drive device able to increase the number of plastic flexible cantilever beams and improved in the centering holding function of the disc to enable high speed revolution to be handled.

To achieve the above object, a disc drive device according to the present invention is a disc drive device having a plastic turntable mounted on a shaft of a spindle motor, wherein this turntable has a disc hole engagement projection provided with a ring-shaped projection and a plurality of centering portions which extend from this ring-shaped projection outwardly in a diametrical direction and have guide surfaces from which an edge of a disc hole easily slides off, a disc carrying portion formed connected to an outer circumference side of this disc hole engagement projection and receiving one surface of the disc, through holes formed defined between adjoining centering portions, and flexible cantilever beams extending in the through holes from the ring-shaped projection outward in the diametrical direction and having front end portions resiliently contacting a hole wall of the disc hole, two or more flexible cantilever beams being arranged in each through hole.

Each through hole is a space for permitting movement of the flexible cantilever beams and a space occupied by a mold required when shaping the flexible cantilever beams by plastic. There is not one flexible cantilever beam for each through hole, but several flexible cantilever beams for each through hole. Therefore, the space between adjoining flexible cantilever beams in a through hole can be shared by both cantilever beams and the space efficiency rises. Accordingly, a turntable provided with over six flexible cantilever beams can be realized, and a disc drive device improved in the centering holding function of the disc so as to be able to handle high speed revolution can be provided.

This turntable is comprised of a ring-shaped back yoke and a ring-shaped chucking magnet fit in a ring-shaped recess formed inside a ring-shaped projection. Further, on a bottom surface of the ring-shaped recess, a plurality of plug projections rise up. These plug projections are fitted in stepped stopper holes formed in a ring-shaped plate of the ring-shaped back yoke whereby the front end portions of the plug projections increase in diameters in the step portions of the stepped stopper holes. For this reason, against a removal force received by the ring-shaped back yoke from the ring-shaped chucking magnet at the time of the chucking, a fastening and fitting force between the plug projections and stepped stopper holes and also a riveting effect of the front end portions of the plug projections upon the stepped stopper holes act, therefore the resistance to removal of the ring-shaped back yoke can be improved.

According to the present invention, there can be provided a disc drive device able to increase the number of plastic flexible cantilever beams and improved in the centering holding function of the disc to enable handling of high speed revolution.

BRIEF DESCRIPTION OF THE DRAWINGS

These and other objects and features of the present invention will become clearer from the following description of the preferred embodiments given with reference to the attached drawings, wherein:

FIG. 2 is a sectional view showing a turntable of the same disc drive device;

DESCRIPTION OF THE PREFERRED EMBODIMENTS

Figure 1:
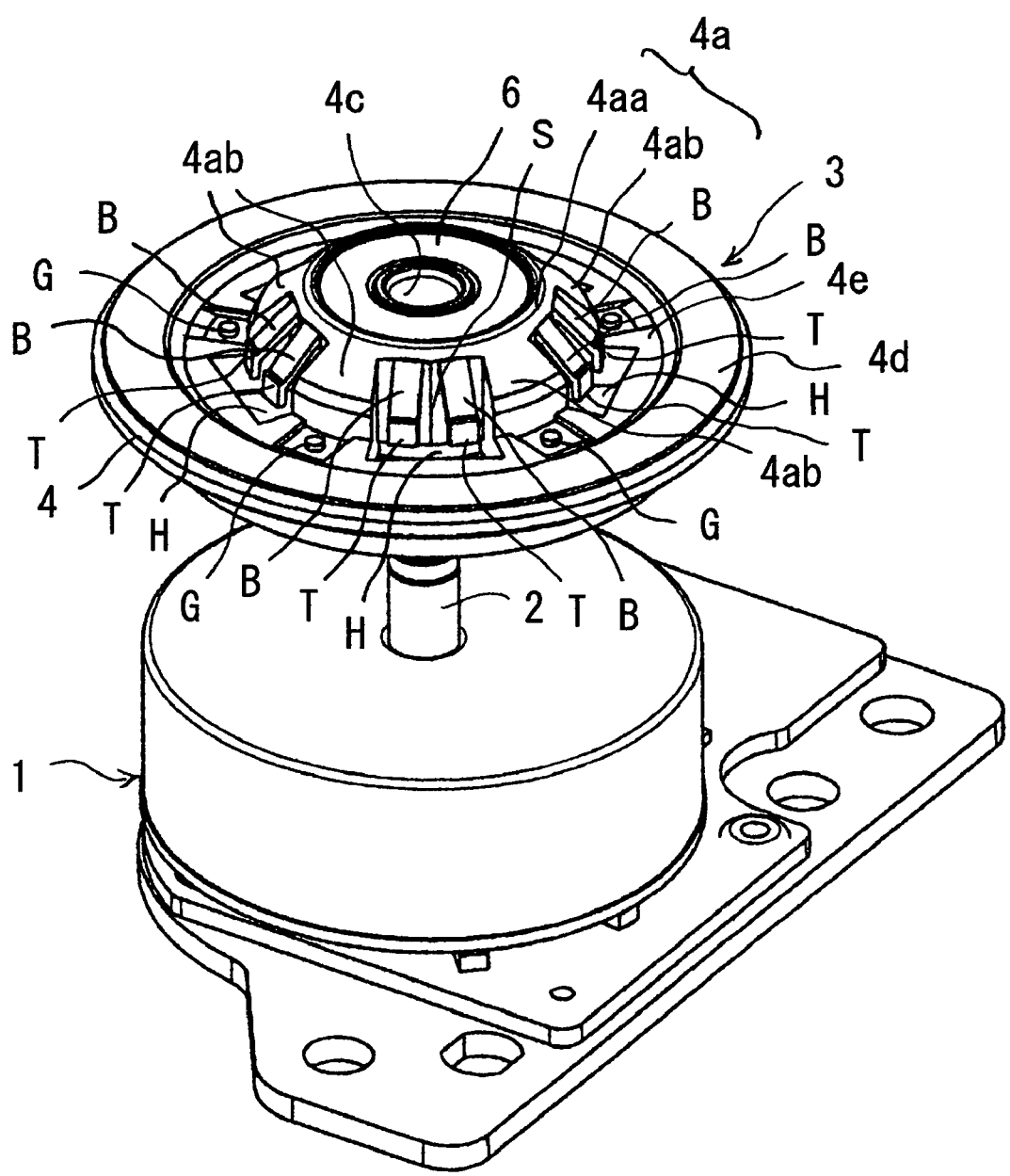
FIG. 1 is a disassembled perspective view showing a disc drive device according to an embodiment of the present invention.
Figure 3A:
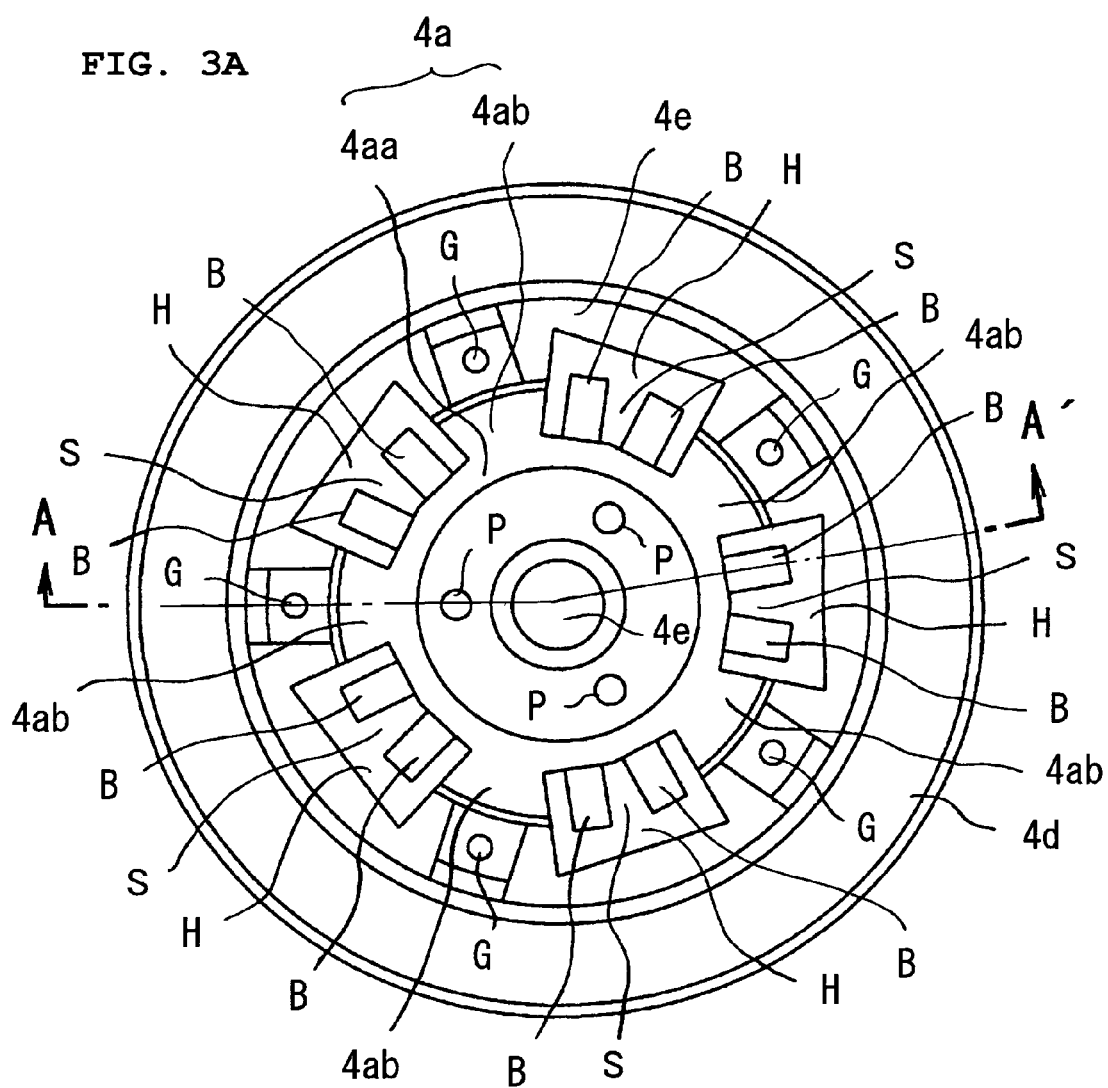
FIG. 3A is a plan view showing a plastic turntable body of the same turntable.
Figure 3B:
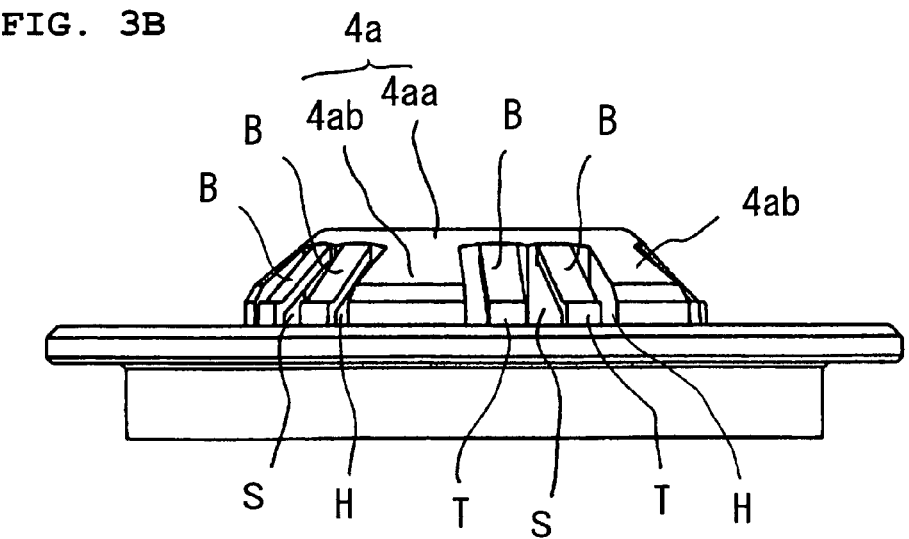
FIG. 3B is a front view of the same plastic turntable body.
Figure 4:
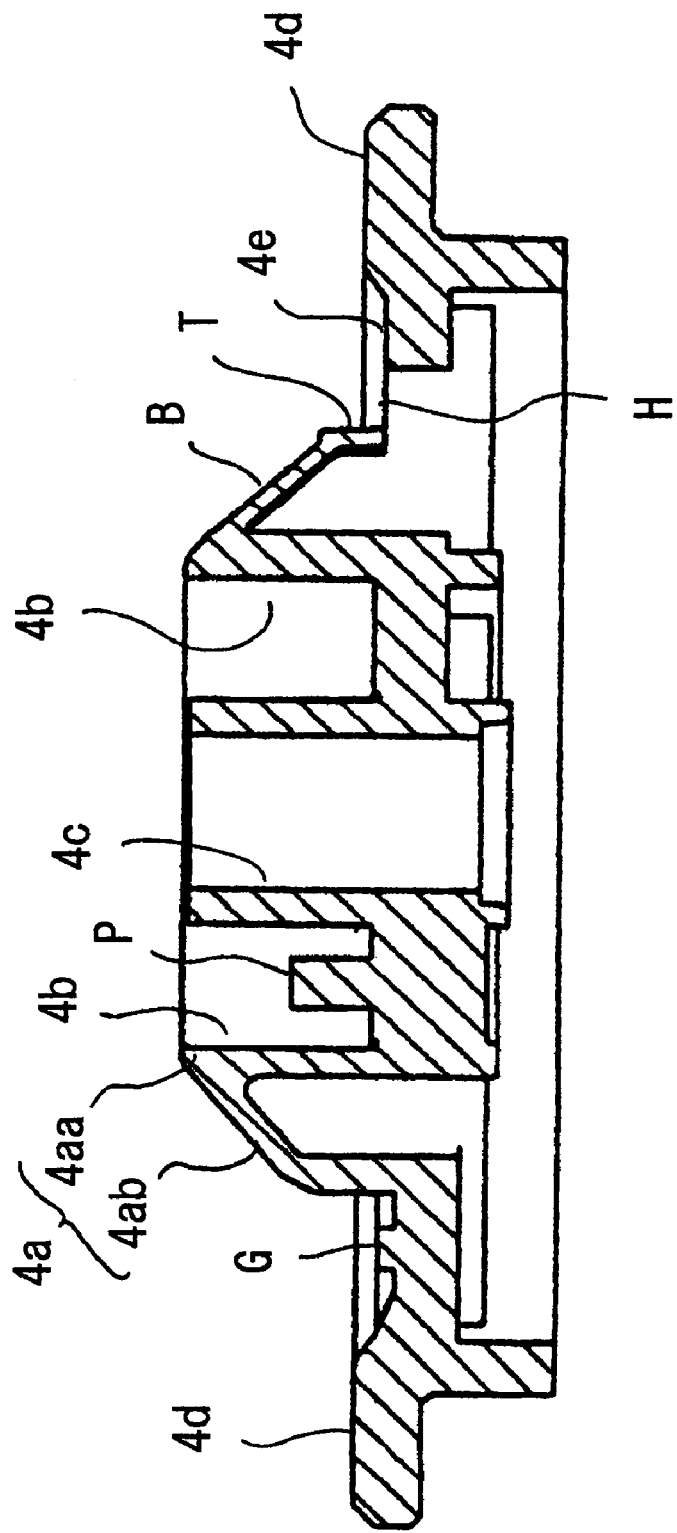
FIG. 4 is a sectional view showing a state cut along an A-A' line in FIG. 3A.

Next, an embodiment of the present invention will be explained based on the attached drawings. FIG. 1 is a disassembled perspective view showing a disc drive device according to an embodiment of the present invention; FIG. 2 is a sectional view showing a turntable of the same disc drive device; FIG. 3A is a plan view showing a plastic turntable body of the same turntable, and FIG. 3B is a front view of the same plastic turntable body; and FIG. 4 is a sectional view showing a state cut along an A-A' line in FIG. 3A.

The disc drive device of the present example has a spindle motor (stepping motor) 1 having a shaft 2 and a turntable 3 mounted on the shaft 2. This turntable 3 has a plastic turntable body 4 having a disc hole engagement projection 4a on an inner circumference side of which a ring-shaped groove 4b is formed, a ring-shaped back yoke plate 5 fitted in the ring-shaped groove 4b, and a ring-shaped chucking magnet 6.

The plastic turntable body 4 has a shaft hole 4c through the center of which the shaft 2 is inserted and a disc carrying portion 4d which is formed so as to be connected to the outer circumference side of the disc hole engagement projection 4a and receives one surface of a disc D. The disc hole engagement projection 4a is integrally provided with a ring-shaped projection 4aa for defining the outer circumference side of the ring-shaped groove 4b and five centering portions (radiating portions) 4ab which extend from this ring-shaped projection 4aa at intervals of 72° outward in the diametrical direction and have tapered guide surfaces with which the edge of the disc hole h easily slide down. The outer circumference surfaces of the centering portions 4ab drop off in steps so that the disc hole h is fitted with a slight clearance and are connected to the disc carrying portion 4d via the ring-shaped recess 4e. Between each adjoining centering portions 4ab and 4ab, a through hole H is formed so that it sticks out to a portion of the ring-shaped recess 4e as well. Further, the plastic turntable body 4 has, in each through hole H, two flexible cantilever beams B and B which extend from the ring-shaped projection 4aa schematically along the above tapered guide surface outward in the diametrical direction and have downwardly bent front end portions T resiliently contacting the hole wall of the disc hole h.

Further, near the centering portions 4ab in the ring-shaped recess 4e, mark projections G corresponding to plastic injection ports remain at the time of the shaping of the plastic turntable body 4. The reach of the plastic to the flexible cantilever beams B and B becomes better at the nearest side through hole H among the through holes H and H on the two sides of that.

On the bottom surface of the ring-shaped groove portion 4b, three plug projections P are formed so as to rise up at intervals of 120°. On the other hand, in the ring-shaped back yoke plate 5, three stepped stopper holes 5a are formed at intervals of 120°. When assembling the ring-shaped back yoke plate 5 into the ring-shaped groove portion 4b, the ring-shaped groove portion 4b is coated with an adhesive material, the ring-shaped back yoke plate 5 is fitted so that plug projections P are fitted in the stepped stopper holes 5a, the plastic at the front end sides of the plug projections P sticking out from the stepped stopper holes 5a are melted and spread in diameter into the step portions of the stepped stopper holes 5a, and rivet head portions R shown in FIG. 2 are formed. After that, the ring-shaped chucking magnet 6 is magnetically stuck to the ring-shaped back yoke plate 5.

Each through hole H is a space for forming a clearance between the plastic portion and the flexible cantilever B and permitting movement of the flexible cantilever beams B and a space occupied by top and bottom molds required when shaping the flexible cantilever beams B by plastic. There is not one flexible cantilever beam B for each through hole H, but two flexible cantilever beams B for each through hole H. Therefore, a space S between adjoining flexible cantilever beams B and B in the through hole H can be shared by both cantilever beams and the space efficiency rises. Accordingly, a turntable 3 provided with a total of 10 flexible cantilever beams B can be realized, and a disc drive device improved in the centering holding function of the disc D so as to be able to handle high speed revolution can be provided.

Further, in addition to the binding force and the fastening and fitting force between plug projections P and stepped stopper holes 5a, the ring-shaped back yoke plate 5 is riveted by the rivet head portions R of the plug projections P, therefore the resistance to removal of the ring-shaped back yoke plate 5 can be improved.

While the invention has been described with reference to specific embodiments chosen for purpose of illustration, it should be apparent that numerous modifications could be made thereto by those skilled in the art without departing from the basic concept and scope of the invention.

The invention claimed is:

1. A disc drive device having a plastic turntable mounted on a shaft of a spindle motor, wherein this turntable has a disc hole engagement projection provided with a ring-shaped projection and a plurality of centering portions which extend from this ring-shaped projection outwardly in a diametrical direction and have guide surfaces from which an edge of a disc hole easily slides off, a disc carrying portion formed connected to an outer circumference side of this disc hole engagement projection and receiving one surface of the disc, through holes formed defined between adjoining centering portions, and flexible cantilever beams extending in the through holes from the ring-shaped projection outward in the diametrical direction and having front end portions resiliently contacting a hole wall of the disc hole, two or more flexible cantilever beams being arranged in each through hole.

2. A disc drive device as set forth in claim 1, wherein a ring-shaped back yoke and a ring-shaped chucking magnet are fit in a ring-shaped recess formed inside the ring-shaped projection; on a bottom surface of the ring-shaped recess, a plurality of plug projections rise up; these plug projections are fitted in stepped stopper holes formed in a ring-shaped plate of the ring-shaped back yoke whereby the front end portions of the plug projections increase in diameters in the step portions of the stepped stopper holes.

3. A disc drive device as set forth in claim 1, wherein the two or more flexible cantilever beams being arranged in each through hole are spaced apart from each other.

* * * * *